US012746991B1

(12) United States Patent
Bland et al.

(10) Patent No.: US 12,746,991 B1
(45) Date of Patent: Sep. 29, 2026

(54) REMOTELY OPERATED VEHICLE FOR ENVIRONMENTAL RESEARCH

(71) Applicant: United States of America as represented by the Administrator of NASA, Washington, DC (US)

(72) Inventors: Geoffrey L. Bland, Parksley, VA (US); Ted Miles, Onley, VA (US); Paul Henry, Wayne, MI (US); James Moon-Dupree, Wayne, MI (US); Kay Rufty, Boulder, CO (US); Suzi Taylor, Bozeman, MT (US); Doug Levin, Chestertown, MD (US); Jonathan Gaines, Tampa, FL (US); David Bydlowski, Wayne, MI (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 778 days.

(21) Appl. No.: 17/981,097

(22) Filed: Nov. 4, 2022

Related U.S. Application Data

(60) Provisional application No. 63/327,109, filed on Apr. 4, 2022.

(51) Int. Cl.
*B62D 61/02* (2006.01)
*B60K 7/00* (2006.01)
(Continued)

(52) U.S. Cl.
CPC ............. *B62D 61/02* (2013.01); *B62D 21/03* (2013.01); *G01D 21/02* (2013.01); *B60K 7/0007* (2013.01); *B60L 1/00* (2013.01)

(58) Field of Classification Search
CPC ...... B62D 12/00; B62D 61/10; B62D 53/005; B60L 1/00
See application file for complete search history.

(56) References Cited

U.S. PATENT DOCUMENTS 3,208,768 A * 9/1965 Hulbert .................... B60D 1/00 280/79.11
5,284,096 A * 2/1994 Pelrine .................... F16L 55/26 301/5.23
(Continued)

OTHER PUBLICATIONS

"Aren Project and GME Team up in TerraROVER Training in Five Locations"; https://science.nasa.gov/science-research/earth-science/terrarover-training/ ; published Jul. 21, 2021.*
(Continued)

*Primary Examiner* — Emma K Frick
(74) *Attorney, Agent, or Firm* — Derek J. Langdon; Matthew F. Johnston; Trenton J. Roche

(57) ABSTRACT

A remotely controlled vehicle includes a vehicle propulsion system having a receiver for receiving speed and direction commands, speed control circuitry coupled to the receiver for converting the speed and direction commands to motor drive signals, a plurality of drive wheel assemblies driven by the motor drive signals, and a first power source coupled to the receiver and speed control circuitry, a sensor and data collection system having one or more environmental sensors, a memory for storing data from the one or more environmental sensors, a microcontroller for controlling the one or more environmental sensors and the memory, a second power source coupled to the one or more environmental sensors, the memory and the microcontroller, and at least one platform on which the vehicle propulsion system and the sensor and data collection system are mounted.

9 Claims, 6 Drawing Sheets

(51) Int. Cl.
*B60L 1/00* (2006.01)
*B62D 21/03* (2006.01)
*G01D 21/02* (2006.01)

(56) References Cited

U.S. PATENT DOCUMENTS

| | | | | |
|---|---|---|---|---|
| 6,484,083 | B1 * | 11/2002 | Hayward | B60D 1/246 700/262 |
| 7,011,171 | B1 * | 3/2006 | Poulter | B62D 61/12 280/5.32 |
| 8,061,461 | B2 * | 11/2011 | Couture | B62D 55/0655 180/9.32 |
| 8,122,982 | B2 * | 2/2012 | Morey | B62D 55/075 180/8.2 |
| 8,297,384 | B2 * | 10/2012 | Wanger | B62K 27/003 180/11 |
| 8,434,576 | B1 * | 5/2013 | Ferguson | B60D 5/00 180/9.32 |
| 8,464,816 | B2 * | 6/2013 | Carrier | B62D 53/005 280/460.1 |
| 9,637,186 | B1 * | 5/2017 | Goldenberg | B62D 55/02 |
| 9,988,113 | B2 * | 6/2018 | Habernegg | B62D 63/061 |
| 10,053,035 | B1 * | 8/2018 | Dixon | B60L 58/12 |
| 10,065,693 | B2 * | 9/2018 | Meager | B60K 1/04 |
| 10,179,508 | B2 * | 1/2019 | Meager | B60F 3/0038 |
| 11,312,435 | B2 * | 4/2022 | Danko | B62D 57/024 |
| 11,325,497 | B2 * | 5/2022 | Miyamoto | B60L 50/60 |
| 11,435,738 | B2 * | 9/2022 | Graf | B62D 29/046 |
| 11,630,025 | B2 * | 4/2023 | McDaniel | B25J 9/0009 702/35 |
| 11,780,282 | B2 * | 10/2023 | Gao | B60K 7/00 280/5.514 |
| 12,168,490 | B2 * | 12/2024 | Rublee | B62D 63/025 |
| 2012/0103705 | A1 * | 5/2012 | Schlee | B25J 5/007 180/14.1 |
| 2017/0158266 | A1 * | 6/2017 | Rudakevych | G05D 1/0022 |
| 2018/0281552 | A1 * | 10/2018 | Lee | B60G 3/01 |
| 2019/0022849 | A1 * | 1/2019 | Akin | B25J 5/005 |
| 2019/0041860 | A1 * | 2/2019 | Jones | G05D 1/0212 |
| 2022/0022388 | A1 * | 1/2022 | Gurau | A01G 23/14 |

OTHER PUBLICATIONS

TerraROVER Factsheet; retrieved from https://technology.nasa.gov/patent/GSC-TOPS-387 on Aug. 11, 2025.*

"DIY Off Road RC Adventure Robot With Action Camera | Gopro SJCam Compatible"; Nevon Projects; https://www.youtube.com/watch?v=EK56k46GwWA ; Sep. 8, 2021.*

* cited by examiner

REMOTELY OPERATED VEHICLE FOR ENVIRONMENTAL RESEARCH

INVENTION BY GOVERNMENT EMPLOYEE(S) ONLY

The invention described herein was made by one or more employees of the United States Government, and may be manufactured and used by or for the Government for governmental purposes without the payment of any royalties thereon or therefor.

ORIGIN OF THE INVENTION

Field

The present disclosure relates to remotely operated vehicles, in particular to modular remotely operated vehicles that may be adapted to gather a variety of environmental data.

Background

There is an unmet need for a remotely operated land based vehicle which may be configured to support different sensors for gathering data on a variety of environmental conditions over a terrestrial area.

SUMMARY

In at least one aspect, the disclosed embodiments are directed to a modular remotely operated vehicle for environmental research capable supporting a variety of environmental sensors for collecting environmental data and the ability to communicate the collected data to a collection facility.

In at least one aspect, the disclosed embodiments are directed to a remotely operated vehicle including a vehicle propulsion system having a receiver for receiving speed and direction commands, speed control circuitry coupled to the receiver for converting the speed and direction commands to motor drive signals, a plurality of drive wheel assemblies driven by the motor drive signals, and a first power source coupled to the receiver and speed control circuitry, a sensor and data collection system having one or more environmental sensors, a memory for storing data from the one or more environmental sensors, a microcontroller for controlling the one or more environmental sensors and the memory, a second power source coupled to the one or more environmental sensors, the memory and the microcontroller, and at least one platform on which the vehicle propulsion system and the sensor and data collection system are mounted.

The at least one platform may include a plurality of platforms fastened together including a first platform on which the vehicle propulsion system and first drive wheel assemblies of the plurality of drive wheel assemblies are mounted, and a second platform on which the sensor and data collection system and second drive wheel assemblies of the plurality of drive wheel assemblies are mounted.

The remotely operated vehicle may include a third platform, fastened to the first platform, fastened to the second platform, or fastened between the first and second platforms, on which additional sensors are mounted.

The additional sensors may include one or more of a visible light camera, an infrared camera, ambient temperature sensor, carbon dioxide sensor, carbon monoxide sensor, distance sensor, global positioning sensor, humidity sensor, infrared temperature sensor, light sensor, methane sensor oxygen sensor, ozone sensor, particulate matter sensor, pressure sensor, solar radiation sensor, surface temperature sensor, volatile organic compound sensor, and wind speed sensor.

Third drive wheel assemblies of the plurality of drive wheel assemblies may be mounted on the third platform.

The vehicle propulsion system and sensor and data system may operate independently to allow sensor and data system operation without compromising vehicle operation reliability.

The plurality of drive wheel assemblies may include drive wheels coupled to motors driven by the motor drive signals, wherein the motor drive signals include differential drive motor signals for driving and steering the vehicle.

The plurality of drive wheels may include a tread pattern and diameter optimized for traction.

The one or more environmental sensors may include one or more of a visible light camera, an infrared camera, ambient temperature sensor, carbon dioxide sensor, carbon monoxide sensor, distance sensor, global positioning sensor, humidity sensor, infrared temperature sensor, light sensor, methane sensor oxygen sensor, ozone sensor, particulate matter sensor, pressure sensor, solar radiation sensor, surface temperature sensor, volatile organic compound sensor, and wind speed sensor.

The speed and direction commands may cause the remotely operated vehicle to travel along a path while the sensor and data collection system operates independently to collect environmental data along the path using the one or more environmental sensors.

In at least another aspect, the disclosed embodiments are directed to a method of collecting environmental data including causing a remotely controlled vehicle to travel along a path by providing a receiver of a vehicle propulsion system of the remotely operated vehicle with speed and direction commands, using speed control circuitry of the vehicle propulsion system to convert the speed and direction commands to motor drive signals, and driving a plurality of drive wheel assemblies of the vehicle propulsion system using the motor drive signals, where the method further includes operating a sensor and data collection system of the remotely operated vehicle to collect environmental data along the path using one or more environmental sensors, and downloading and remotely storing the collected data during or after the remotely operated vehicle completes the path.

The method of collecting environmental data may include analyzing the remotely stored data to produce a map of characteristics of the environment along the path.

The method of collecting environmental data may include operating the vehicle control system and sensor and data collection system independently to allow sensor and data system operation without compromising vehicle operation reliability.

The one or more environmental sensors may include one or more of a visible light camera, an infrared camera, ambient temperature sensor, carbon dioxide sensor, carbon monoxide sensor, distance sensor, global positioning sensor, humidity sensor, infrared temperature sensor, light sensor, oxygen sensor, particulate matter sensor, pressure sensor, solar radiation sensor, surface temperature sensor, volatile organic compound sensor, and wind speed sensor.

DETAILED DESCRIPTION

The disclosed remotely controlled vehicle may be suited for educational and data gathering activities.

Figure 1:
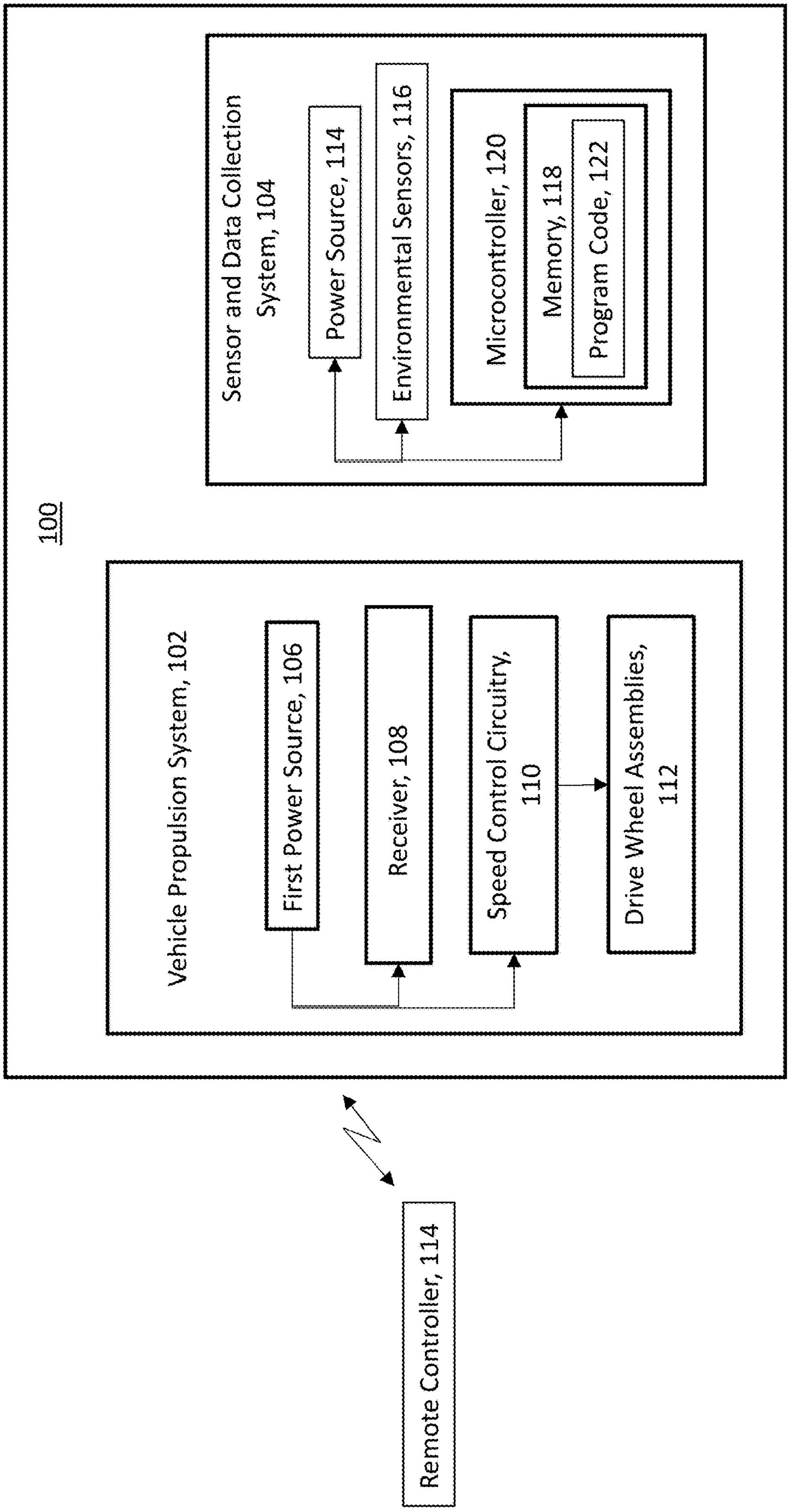
FIG. 1 illustrates a schematic block diagram of the remotely operated vehicle.

As shown in FIG. 1, the remotely operated vehicle 100 may include a vehicle propulsion system 102 and a sensor and data collection system 104.

The vehicle propulsion system 102 may include a first power source 106, a receiver 108, speed control circuitry 110, and a plurality of drive wheel assemblies 112.

The first power source 106 may be a battery or other self contained power source adapted to be mounted on the remotely operated vehicle 100.

The receiver 108 may be a radio control receiver, for example, capable of receiving multiple channels of pulse width modulated wireless signals using at least one wireless protocol, over which speed and direction signals may be transmitted. The receiver 108 may include a receiver microcontroller with a receiver memory and a receiver communication interface. The receiver memory may be a non-transitory computer readable medium and may store computer readable program code. The computer readable program code may be operable to convert the receiver microcontroller to a special purpose computing device for carrying out and executing the operation of the vehicle propulsion system as described herein. The computer readable medium may include magnetic media, semiconductor media, optical media, or any media which is readable by the receiver microcontroller, which in turn may execute the computer readable program code. The receiver 108 may communicate with a remote controller 114 and provide an output of the speed and direction signals as pulse position modulation signals.

The remote controller 114 may be a radio control transmitter capable of broadcasting multiple channels of pulse width modulated wireless signals, including speed and direction signals, using at least one wireless protocol. The remote controller 114 may include a remote controller microcontroller with a remote controller memory and a remote controller communication interface. The remote controller memory may be a non-transitory computer readable medium and may store computer readable program code. The computer readable program code may be operable to convert the remote controller microcontroller to a special purpose computing device for carrying out and executing operations of the remote controller as described herein. The computer readable medium may include magnetic media, semiconductor media, optical media, or any media which is readable by the remote controller microcontroller, which in turn may execute the computer readable program code.

The receiver 108 and remote controller 114 may operate together as a multichannel digital proportional radio control system and may be paired using a common key to prevent interference with or from other electromagnetic signals.

The speed controller circuitry 110 may be coupled to drive wheel assemblies 112 of the remotely operated vehicle 110 and may operate to convert the pulse position modulated speed and direction signals to motor drive signals. According to the disclosed embodiments, the drive wheel assemblies 112 include drive wheels coupled to motors driven by the motor drive signals.

The sensor and data collection system 104 may include a second power source 114, one or more environmental sensors 116, and a memory 118 for storing data from the one or more environmental sensors 116. The memory 118 may be a component of a microcontroller 120.

The second power source 114 may be a battery or other self contained power source adapted to be mounted on the remotely operated vehicle 100.

The one or more environmental sensors may include one or more of a visible light camera, an infrared camera, ambient temperature sensor, carbon dioxide sensor, carbon monoxide sensor, distance sensor, global positioning sensor, humidity sensor, infrared temperature sensor, light sensor, oxygen sensor, particulate matter sensor, pressure sensor, solar radiation sensor, surface temperature sensor, volatile organic compound sensor, wind speed sensor, or any other sensor suitable for determining a location of the remotely operated vehicle 100 or environmental conditions in a vicinity of the remotely operated vehicle 100.

The microcontroller 120 may also include computer readable program code 122 stored in the memory 118 which may be a non-transitory computer readable medium. The computer readable program code 122 may be operable for carrying out and executing the operation of the sensor and data collection system 104 as described herein. The computer readable medium may include magnetic media, semiconductor media, optical media, or any media which is readable by the microcontroller 120, which may execute the computer readable program code 122.

The vehicle control system and sensor and data collection system are isolated and operate independently for reliability of platform operation and to allow experimentation with the sensor and data collection system without compromising platform reliability.

Figure 2A:
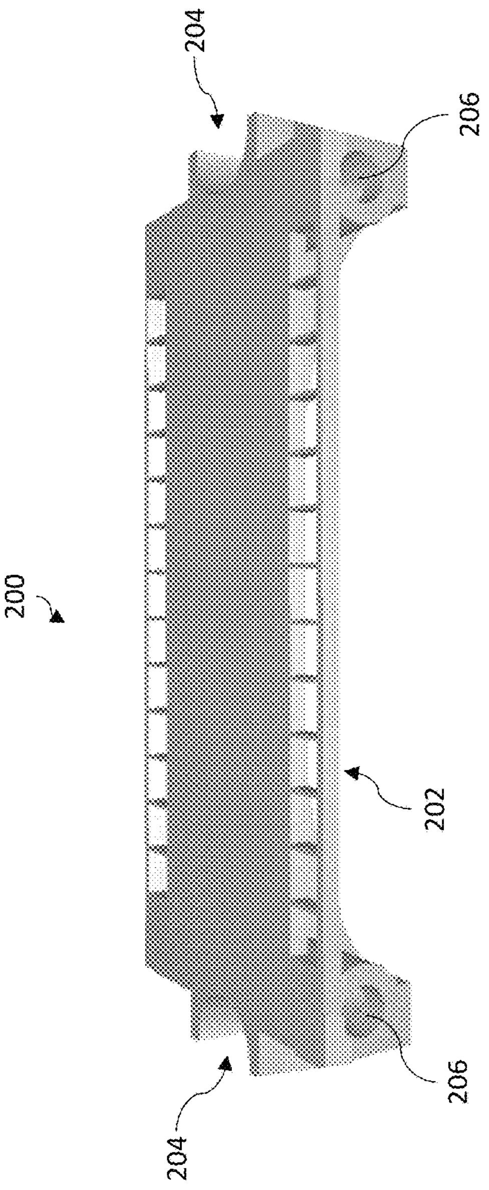
FIG. 2A shows a top perspective view.
Figure 2B:
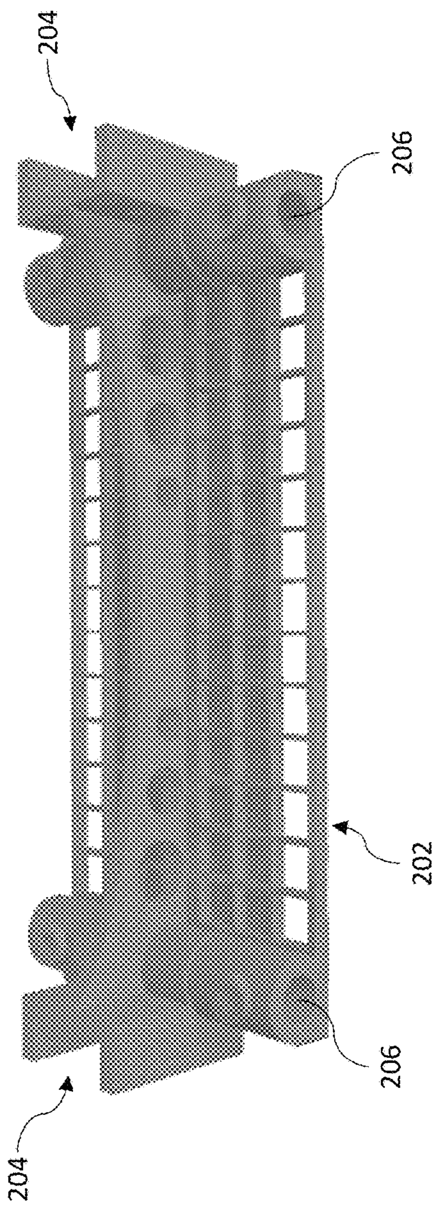
FIG. 2B shows a bottom perspective view of a platform on which components of the remotely operated vehicle may be mounted.

In at least one embodiment, the vehicle propulsion system 102 and sensor and data collection system 104 may be mounted on a platform 200, for which a top perspective view is shown in FIG. 2A and a bottom perspective view is shown in FIG. 2B. The platform 200 may include mounting holes 202 for mounting components of the vehicle propulsion system 102, mounts 204 for the drive wheel assemblies 112, and connecting bores 206, for inserting connecting members, rods, or spars between platforms.

Figure 3:
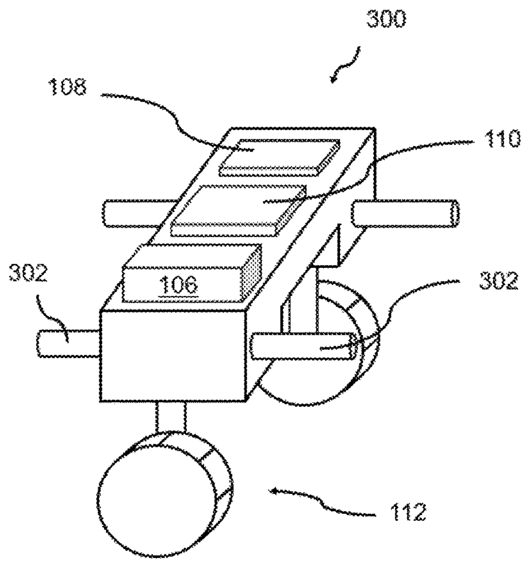
FIG. 3 illustrates an exemplary platform on which components of a vehicle propulsion system may be mounted.

FIG. 3 illustrates an exemplary first platform 300 on which components of the vehicle propulsion system 102 may be mounted. The exemplary platform 300 includes the first power source 106, the receiver 108, the speed control circuitry 110, and drive wheel assemblies 112. The exemplary first platform 300 includes connecting members 302 inserted in connecting bores for connecting the exemplary first platform 300 to other platforms.

Figure 4:
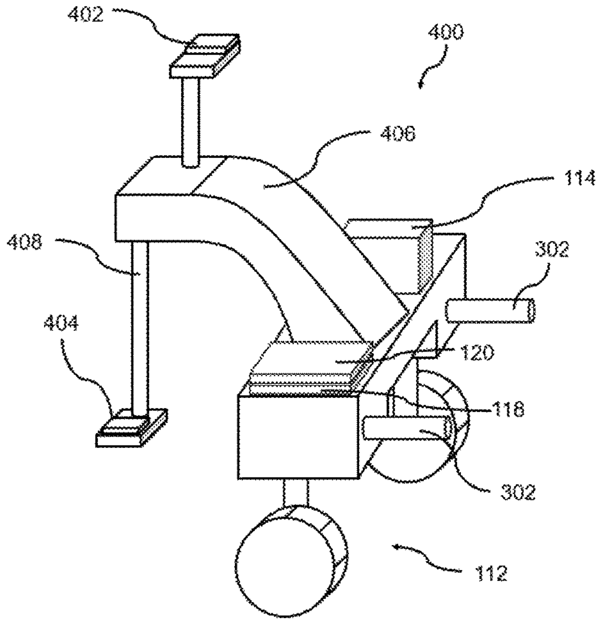
FIG. 4 illustrates an exemplary platform on which components of a sensor and data collection system may be mounted.

FIG. 4 illustrates an exemplary second platform 400 on which components of the sensor and data collection system 104 may be mounted. The exemplary second platform 400 may include the second power source 106, and environmental sensors in the form of an ambient temperature sensor 402 and a surface temperature sensor 404. The ambient temperature sensor 402 may be mounted on a first arm 406 which may extend upward to reduce effects from a surface on which the remotely operated vehicle may be traveling, and the surface temperature sensor 404 may be mounted on a second arm 408 extending downward to ensure proper measurement of the surface. The exemplary second platform 400 may include also include the memory 118 and the microcontroller 120 mounted on a stack of component mounting boards. In some embodiments, the memory 118 may be a removable memory card, for example, a removable secure digital (SD) non-volatile memory card. The exemplary second platform 400 may further include drive wheel assemblies 112. The exemplary second platform 400 may also include connecting members 302 inserted in connecting bores for connecting the exemplary second platform 400 to other platforms.

Figure 5:
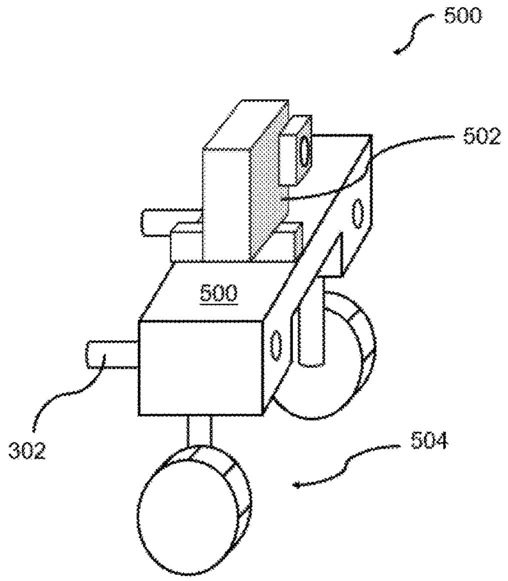
FIG. 5 illustrates an exemplary platform on which additional sensors may be mounted.

FIG. 5 illustrates an exemplary third platform 500 on which a visible light camera 502 and drive wheel assemblies 504 are mounted, and connecting members 302 are inserted in connecting bores for connecting the exemplary platform 500 to other platforms.

While the exemplary platforms 300, 400, 500 are referred to as first, second, and third platforms respectively, it should be understood that no particular number of platforms are required and that platforms may be assembled together in any order.

Figure 6:
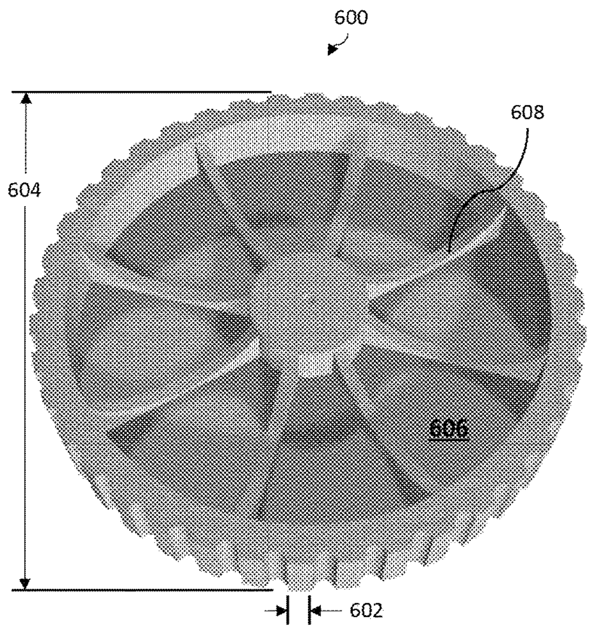
FIG. 6 illustrates an exemplary wheel for use with the remotely operated vehicle.

FIG. 6 illustrates an exemplary wheel 600. The wheel 600 is generally designed to optimize traction over a number of different surfaces, for example, asphalt, concrete, and dry soil, by an empirical selection of tread tooth spacing 602 and diameter 604. The wheel 600 also includes recesses 606 and structural vanes 608 in order to reduce weight and power required for rotation. An outer sleeve of a resilient material may be added to the outside diameter of the wheel for particular applications. In some embodiments, the tread tooth spacing may be 5 mm and the wheel diameter may be 80 mm.

In operation, a user may initiate operation of the sensor and data collection system 104, and then independently use the remote controller to operate the vehicle propulsion system 102 to drive the remotely operated vehicle 100 along a path by providing the receiver 108 with speed and direction commands, where the speed control circuitry of the vehicle propulsion system operates to convert the speed and direction commands to motor drive signals. The drive signals are used to drive the drive wheel assemblies 112 of the vehicle propulsion system 102 while the sensor and data collection system 104 operates independently to collect environmental data along the path using one or more environmental sensors. The collected environmental data may be downloaded and remotely stored during or after the remotely operated vehicle completes the path.

Once downloaded, the collected environmental data may be analyzed to produce a map of characteristics of the environment along the path.

Figure 7:
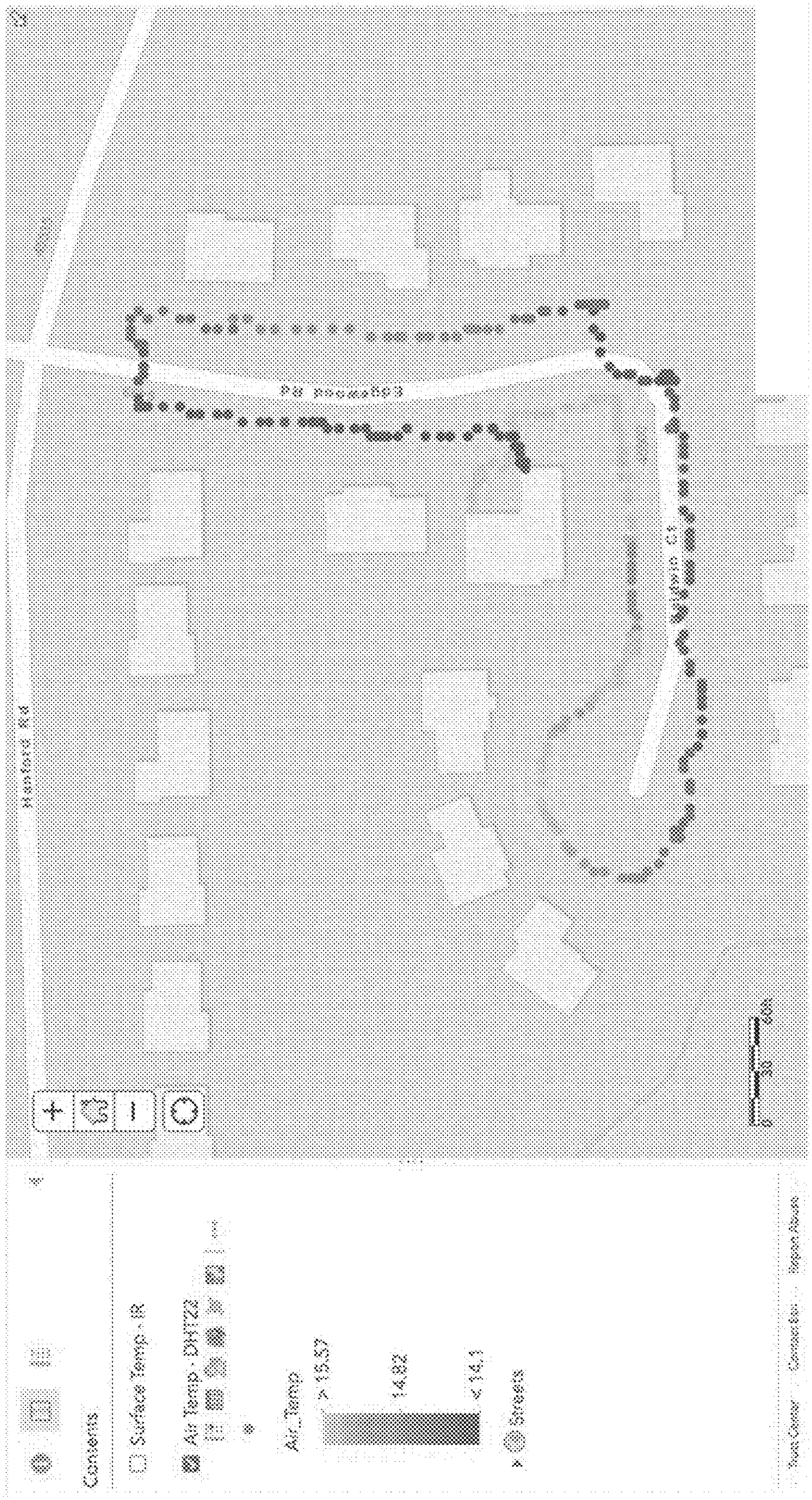
FIG. 7 shows an air temperature map obtained using the remotely operated vehicle.
Figure 8:
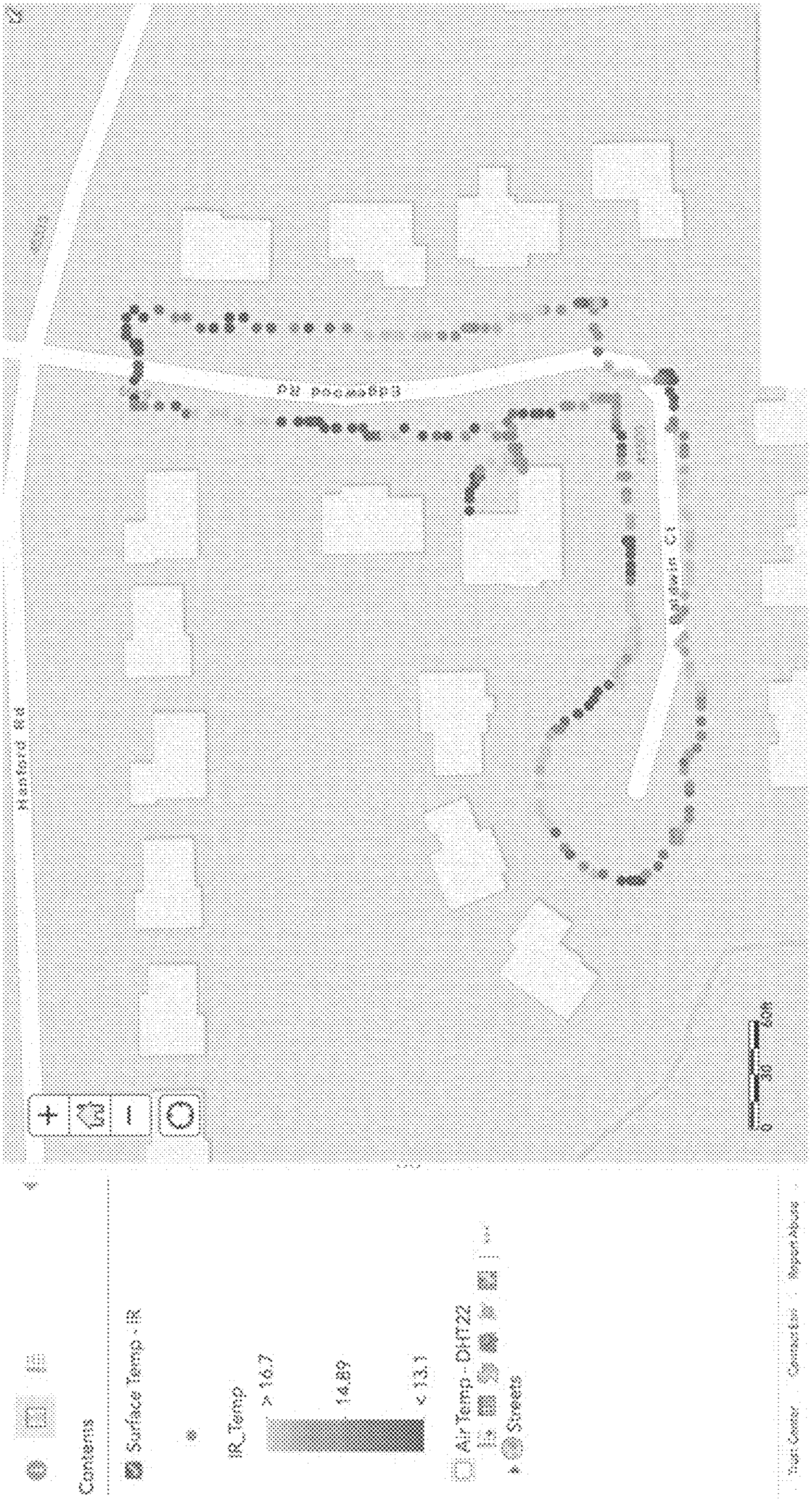
FIG. 8 shows a surface temperature map obtained using the remotely operated vehicle.

FIG. 7 shows an air temperature map obtained, for example, using the ambient temperature sensor, during operations of the remotely operated vehicle and FIG. 8 shows a surface temperature map obtained, for example, using the surface temperature sensor during operations of the remotely operated vehicle. While an air temperature map and a surface temperature map are illustrated, it should be understood that one or more maps of any environmental conditions may be generated using any of the environmental and additional sensors, alone or in any combination.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

What is claimed is:

1. A remotely controlled vehicle comprising:

a vehicle propulsion system mounted on a first platform, the vehicle propulsion system comprising;

a receiver for receiving speed and direction commands;

speed control circuitry coupled to the receiver for converting the speed and direction commands to motor drive signals;

a plurality of drive wheel assemblies driven by the motor drive signals; and a first power source coupled to the receiver and speed control circuitry;

a sensor and data collection system mounted on a second platform, the sensor and data collection system comprising:

one or more environmental sensors;

a memory for storing data from the one or more environmental sensors;

a microcontroller for controlling the one or more environmental sensors and the memory; and a second power source coupled to the one or more environmental sensors, the memory and the microcontroller; and a plurality of connecting members, wherein the first platform and the second platform each have a plurality of connecting bores in which the plurality of connecting members are inserted to fasten the first platform and the second platform, wherein the first platform has a first set of drive wheel assemblies of the plurality of drive wheel assemblies mounted thereon and the second platform has a second set of drive wheel assemblies of the plurality of drive wheel assemblies mounted thereon.

2. The remotely operated vehicle of claim 1, further comprising a third platform on which additional sensors are mounted, wherein the third platform has a third plurality of connecting bores in which the plurality of connecting members are inserted to fasten the third platform to both the first platform and the second platform.

3. The remotely operated vehicle of claim 2, wherein the additional sensors include one or more of a visible light camera, an infrared camera, ambient temperature sensor, carbon dioxide sensor, carbon monoxide sensor, distance sensor, global positioning sensor, humidity sensor, infrared temperature sensor, light sensor, methane sensor oxygen sensor, ozone sensor, particulate matter sensor, pressure sensor, solar radiation sensor, surface temperature sensor, volatile organic compound sensor, and wind speed sensor.

4. The remotely operated vehicle of claim 2, wherein third drive wheel assemblies of the plurality of drive wheel assemblies are mounted on the third platform.

5. The remotely operated vehicle of claim 1, wherein the vehicle propulsion system and sensor and data system operate independently to allow sensor and data system operation without compromising vehicle operation reliability.

6. The remotely operated vehicle of claim 1, wherein the plurality of drive wheel assemblies include drive wheels coupled to motors driven by the motor drive signals, wherein the motor drive signals include differential drive motor signals for driving and steering the vehicle.

7. The remotely operated vehicle of claim 6, wherein each of the plurality of drive wheel assemblies comprise a wheel having a tread tooth spacing of approximately 5 millimeters and wheel diameter of approximately 80 millimeters.

8. The sensor and data collection system of claim 1, wherein the one or more environmental sensors include one or more of a visible light camera, an infrared camera, ambient temperature sensor, carbon dioxide sensor, carbon monoxide sensor, distance sensor, global positioning sensor, humidity sensor, infrared temperature sensor, light sensor, methane sensor oxygen sensor, ozone sensor, particulate matter sensor, pressure sensor, solar radiation sensor, surface temperature sensor, volatile organic compound sensor, and wind speed sensor.

9. The remotely operated vehicle of claim 1, wherein the speed and direction commands cause the remotely operated vehicle to travel along a path while the sensor and data collection system operates independently to collect environmental data along the path using the one or more environmental sensors.

* * * * *